Jan. 22, 1929.
J. REID
1,699,920
GREASE RECOVERING DEVICE
Filed Sept. 1, 1927
2 Sheets-Sheet 1
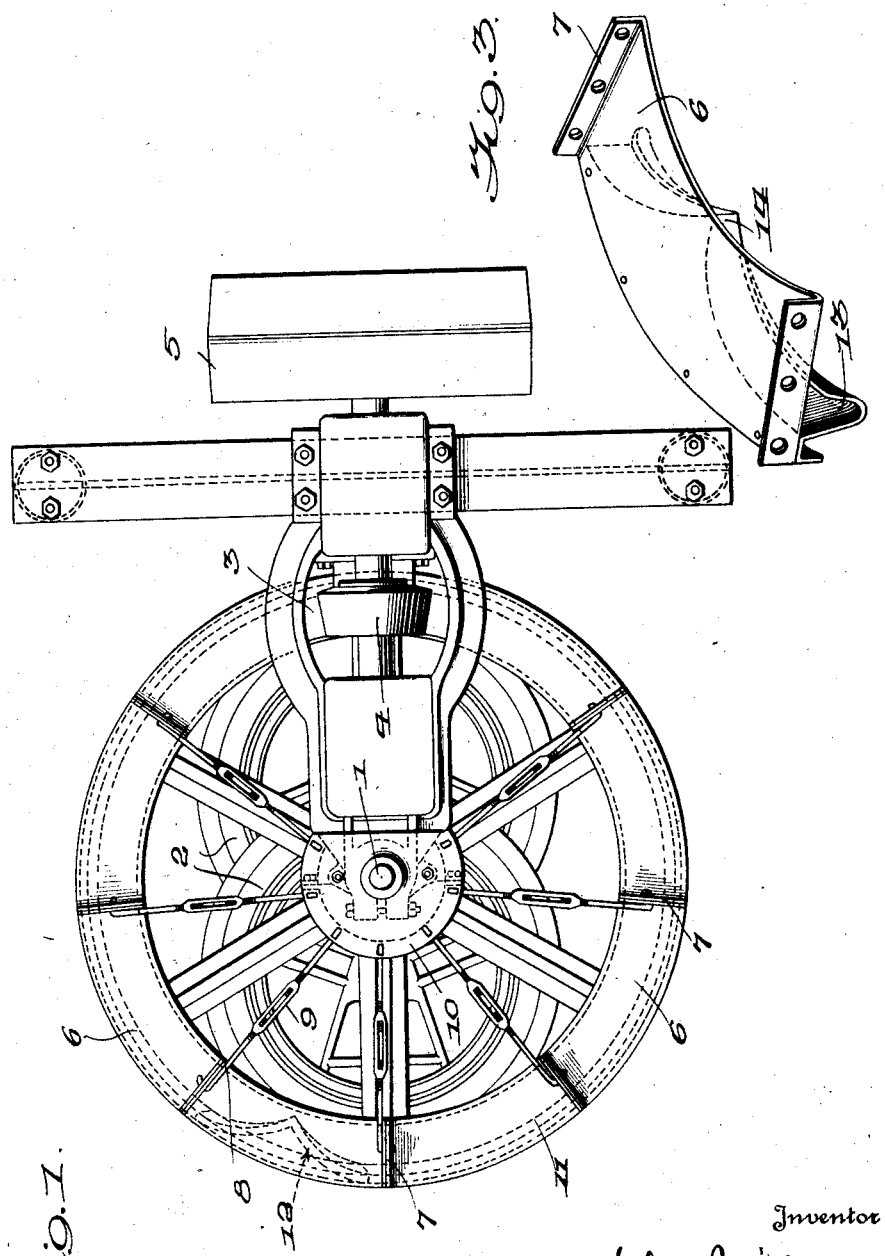
Inventor
John Reid
By
Attorneys Jan. 22, 1929.  
J. REID  
1,699,920  
GREASE RECOVERING DEVICE  
Filed Sept. 1, 1927   2 Sheets-Sheet 2
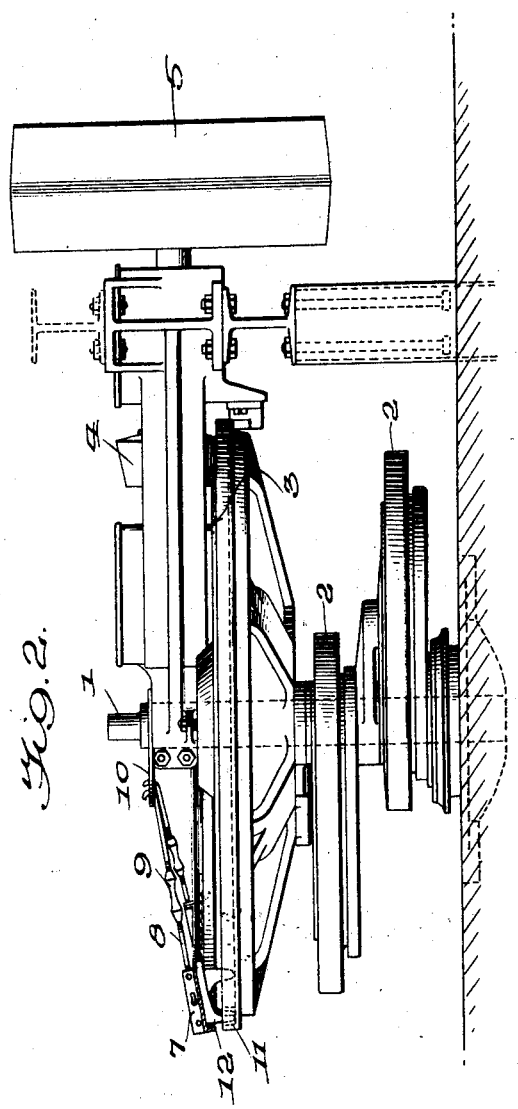
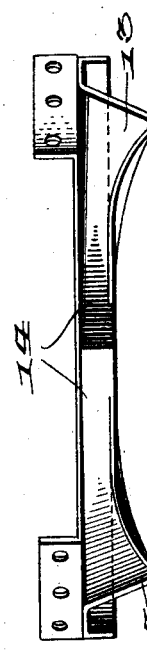
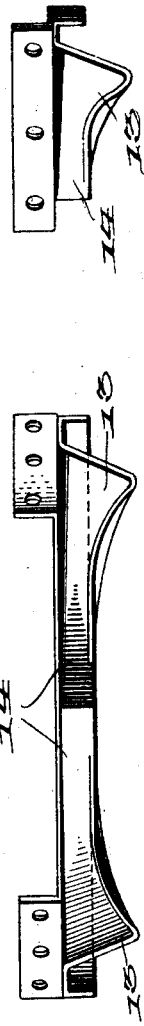
Inventor
John Reid Patented Jan. 22, 1929.

1,699,920

UNITED STATES PATENT OFFICE.

JOHN REID, OF OIL CITY, PENNSYLVANIA, ASSIGNOR TO JOSEPH REID GAS ENGINE COMPANY, OF OIL CITY, PENNSYLVANIA.

GREASE-RECOVERING DEVICE.

Application filed September 1, 1927. Serial No. 216,995.

This invention relates to a device for recovering lubricating grease as it is squeezed off the teeth of a gear and returning it to the gear teeth.

The gear is provided with a peripheral groove which catches the grease as it is squeezed from the teeth. A scoop dipping into the groove gathers the grease and a share joined to the scoop returns it to the gear teeth. For gears which may rotate in either direction I provide two oppositely directed scoops having shares terminating at a common point at which they are joined.

The invention will now be described in detail in connection with the accompanying drawing in which I have shown one illustrative embodiment as applied to a pumping power.

Fig. 1 is a plan view of a pumping power with my invention applied,

Fig. 2 is a side elevation thereof,

Fig. 3 is a perspective view of the grease distributing device, and

Figs. 4 and 5 are front and end elevations respectively of the same.

On a vertical shaft 1 are mounted driving eccentrics 2 and a driven gear 3. A pinion 4 driven by a belt pulley 5 meshes with gear 3. The gear 3 is covered, except where it is in mesh with pinion 4, by a shield composed of sections 6. The sections 6 are provided with apertured flanges 7 whereby they are supported by means of tension rods 8 having turnbuckles 9 and hooked at their opposite ends in a central flange 10. In Fig. 2 the sections 6 on the near side have been omitted for clearness of illustration. The gear 3 has a peripheral groove 11 which catches grease squeezed off of gear 3 by pinion 4.

On the lower side of one of the sections 6 is riveted or otherwise secured a grease distributing device 12 consisting of scoops 13 and shares 14. The scoops dip into groove 11 and one or the other, depending upon the direction of rotation of gear 3, picks up the grease from the groove and, as more and more grease is gathered, delivers it to the share 14 by which it is carried out over the gear 3. The outer ends of the shares 14 are substantially vertical and without any bottom ledge so that as the grease is moved along by the pressure of additional grease picked up by the scoop, it drops off the vertical end portion of the share onto gear 3. In this way a constant lubrication of the gear is maintained. The relative positions of the scoops and the grease collecting groove can be adjusted by turnbuckles 9.

Having described my invention, I claim:

1. The combination with a gear of a peripheral groove on said gear adapted to catch grease squeezed from the teeth of said gear, a scoop dipping into said groove and a share joined to said scoop adapted to guide the grease gathered by said scoop to the teeth of said gear.

2. The combination with a gear arranged horizontally with its toothed side uppermost of a peripheral grease collecting groove on said gear, a scoop dipping into said groove and a share extending from said scoop over said gear and terminating above the teeth thereof.

3. The combination with a gear arranged horizontally with its toothed side uppermost of a peripheral grease collecting groove on said gear, a scoop dipping into said groove and a share curving inwardly from said scoop over said gear and terminating in a substantially vertical portion over the teeth of said gear.

4. The combination with a gear arranged horizontally with its toothed side uppermost and adapted to be rotated in either direction of a peripheral grease collecting groove on said gear, and a grease recovering device operative upon rotation of said gear in either direction comprising a pair of oppositely directed scoops dipping into said grease collecting groove, and shares extending inwardly from said scoops and joining at their termini over the teeth of said gear.

The foregoing specification signed at Oil City, Pa., this 6th day of July, 1927.

JOHN REID.